United States Patent [19]

Oosaka

[11] Patent Number: 4,703,373
[45] Date of Patent: Oct. 27, 1987

[54] DEVICE FOR LOADING OR UNLOADING MAGNETIC DISC PACK

[75] Inventor: Shigenori Oosaka, Kanagawa, Japan

[73] Assignee: Fuji Photo Film Co., Ltd., Kanagawa, Japan

[21] Appl. No.: 855,230

[22] Filed: Apr. 24, 1986

Related U.S. Application Data

[62] Division of Ser. No. 648,228, Sep. 7, 1984, abandoned.

[30] Foreign Application Priority Data

Sep. 8, 1983 [JP] Japan .................................. 58-165470
Jul. 20, 1984 [JP] Japan .................................. 59-150656

[51] Int. Cl.$^4$ ..................... G11B 17/035; G11B 17/04
[52] U.S. Cl. ........................................... 360/97; 360/99
[58] Field of Search .................... 360/86, 97, 99, 133; 369/75.2, 77.1, 77.2, 258, 261, 270, 271

[56] References Cited

U.S. PATENT DOCUMENTS

| | | | |
|---|---|---|---|
| 4,479,210 | 10/1984 | Nakayama | 369/75.2 X |
| 4,498,161 | 2/1985 | Eisemann | 369/75.2 |
| 4,562,498 | 12/1985 | Shibata | 360/97 |
| 4,607,361 | 8/1986 | Schultmaker et al. | 369/75.2 |

Primary Examiner—Stuart N. Hecker
Assistant Examiner—Benjamin E. Urcia
Attorney, Agent, or Firm—Sughrue, Mion, Zinn, Macpeak & Seas

[57] ABSTRACT

A device for loading or unloading a magnetic disc pack includes a lid pivotally supported by a main body of the magnetic recorder or reproducer; and an inner cassette holder pivotally supported on the main body or the lid, having a configuration in which the magnetic disc pack incorporating a magnetic disc can be received and which is capable of being separated from the lid or the main body to expose an opening, into which the magnetic disc pack is inserted when the lid is opened, and a push member for pushing the center core of the magnetic disc toward the rotary drive shaft. By the closing operation of the lid, the cassette holder is guided to a position where the center core of the magnetic disc can be coupled onto the rotary drive shaft and the push member is guided through a position where the push member pushes the center core of the magnetic disc and to a position where the push member is out of contact with the center core of the magnetic disc.

9 Claims, 13 Drawing Figures

DEVICE FOR LOADING OR UNLOADING MAGNETIC DISC PACK

This is a division of application Ser. No. 648,228, filed Sept. 7, 1984, now abandoned.

BACKGROUND OF THE INVENTION

1. Field of the Invention

This invention relates to a device for loading or unloading a magnetic disc pack, and particularly to a device for loading or unloading a magnetic disc pack used for a magnetical recorder or a reproducer for an electronic camera and the like and capable of magnetically recording still image information and the like.

2. Description of the Prior Art

Recently, there has been developed an electronic still camera system wherein an image pickup device such as a charge coupled device (CCD) or an image pickup tube is combined with a recording device using a magnetic disc which is an inexpensive recording medium and has a comparatively high memory capacity. With this system, a subject is still-photographed electronically and the image is recorded into a rotating magnetic disc, and the reproduction of an image is carried out by a television, a printer or the like. Such systems have become the object of public attention.

The magnetic disc utilized in the above-described system is generally used in the form of a magnetic disc pack. This magnetic disc pack has rotatably mounted therein a magnetic disc capable of magnetically recording therein still image information and the like, and is installed on a magnetic recorder assembled into an electronic camera, or on a reproducer integrally formed on the magnetic recorder or separately formed therefrom. In installing the magnetic disc pack in the magnetic recorder or the reproducer in the electronic camera, it is troublesome and inconvenient to directly couple a center hole formed in a center core located at the central portion of the magnetic disc in the magnetic disc pack onto a rotary drive shaft of the magnetic recorder or reproducer. It is possible that the magnetic disc pack cannot be accurately installed onto the magnetic recorder or reproducer. In order to eliminate the above-described difficulty, there has been proposed a device for loading or unloading a magnetic disc pack, the device including a lid supported on a main body of the magnetic recorder or reproducer and an inner bucket supported by the main body or the lid and having received therein the magnetic disc pack. The magnetic disc pack is inserted into the inner bucket and then the lid is closed, whereby the magnetic disc in the magnetic disc pack inserted into the inner bucket is coupled onto a rotary drive shaft of the main body of the magnetic recorder or reproducer.

Now, it is necessary to accurately couple the center core of the magnetic disc onto the rotary drive shaft. If this coupling is unsatisfactorily made, there is a possibility that the magnetic head cannot accurately record the image signals on the magnetic disc or reproduce the same therefrom. For this reason, there has heretofore been proposed a magnetic chuck type device, in which the rotary drive shaft is coupled into the center hole of the center core of the magnetic disc, while, at the same time, the center core is attracted toward the drive shaft by a magnetic force of a magnet secured to the rotary drive shaft. Even this arrangement is unsatisfactory.

Furthermore, during unloading of the magnetic disc pack, the supply of electric current to the rotary driving source is turned off. However, the drive shaft still rotates due to the inertial force. In consequence, under this condition, if the lid is opened and the center core of the magnetic disc is withdrawn from the driving source, then there is a possibility of damaging the center core and/or the drive shaft.

SUMMARY OF THE INVENTION

The present invention has been developed to obviate the above-described disadvantages of the prior art and has as its object the provision of a device for loading or unloading a magnetic disc pack, wherein, in loading the magnetic disc pack into a magnetic recorder-reproducer, a center core of a magnetic disc can be reliably coupled onto a rotary drive shaft.

To this end, the present invention contemplates that there are provided a bucket for receiving the magnetic disc pack having rotatably mounted therein the magnetic disc and a push member for pushing the center core of the magnetic disc toward the rotary drive shaft. The bucket is guided to a position where the center core of the magnetic disc is coupled onto the rotary drive shaft, and the push member is guided through a position where the push member pushes the center core of the magnetic disc and to a position where the push member is out of contact with the center core of the magnetic disc.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and therein:

FIGS. 8(A), 8(B) to 10(A), 10(B) show the process of vertical movement of the lid and the inner bucket, FIGS. 8(A), 9(A) and 10(A) being side views, and FIGS. 8(B), 9(B) and 10(B) being sectional front views.

DETAILED DESCRIPTION OF THE INVENTION

Detailed description will hereunder be given of the preferred embodiment of a device for loading or unloading a magnetic disc pack according to the present invention with reference to the accompanying drawings.

Figure 1:
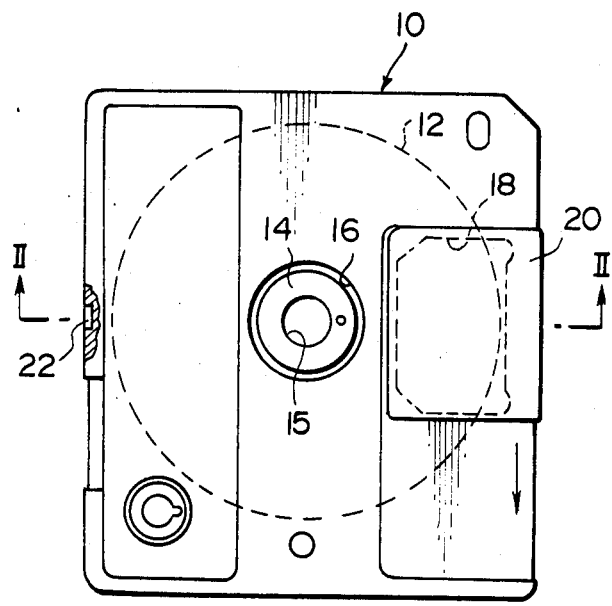
FIG. 1 is a plan view showing the magnetic disc pack.
Figure 2:
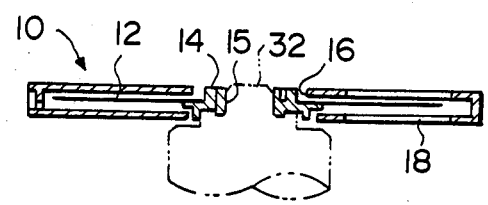
FIG. 2 is a sectional view showing the magnetic disc pack, taken along the line II—II in FIG. 1.

FIG. 1 is a plan view showing a magnetic disc pack used in a magnetic recorder or a reproducer in an electronic camera or the like, and FIG. 2 is a sectional view taken along the line II—II in FIG. 1. As shown in FIG. 1, the magnetic disc pack 10 is formed into a generally square shape and has rotatably mounted therein a magnetic disc 12 capable of recording therein still image information and the like. The magnetic disc 12 is provided in the central portion thereof with a center core 14 as being a reinforcing member, which is exposed to outside through a circular opening 16 of the magnetic disc pack 10. The magnetic disc pack 10 is formed with a window 18, at which is located a magnetic head to be described hereunder. This window 18 for the magnetic head is opened or closed by a slidable shutter 20. More specifically, before the magnetic disc pack 10 is inserted into an inner bucket to be described hereunder, the shutter 20 closes the window 18 to prevent dust from being attached to the magnetic disc 12, and, when the magnetic disc pack 10 is inserted into the inner bucket, the shutter 20 moves downward in FIG. 1 to open the window 18 for the magnetic head, whereby the recording in the magnetic disc 12 and the reproduction therefrom can be performed. An engageable recess 22 is formed at an end face opposite to the shutter 20 of the magnetic disc pack 10. This recess 22 is used as a provisional lock for the magnetic disc pack 10 when the magnetic disc 12 is inserted into the inner bucket as will be described hereunder.

Figure 3:
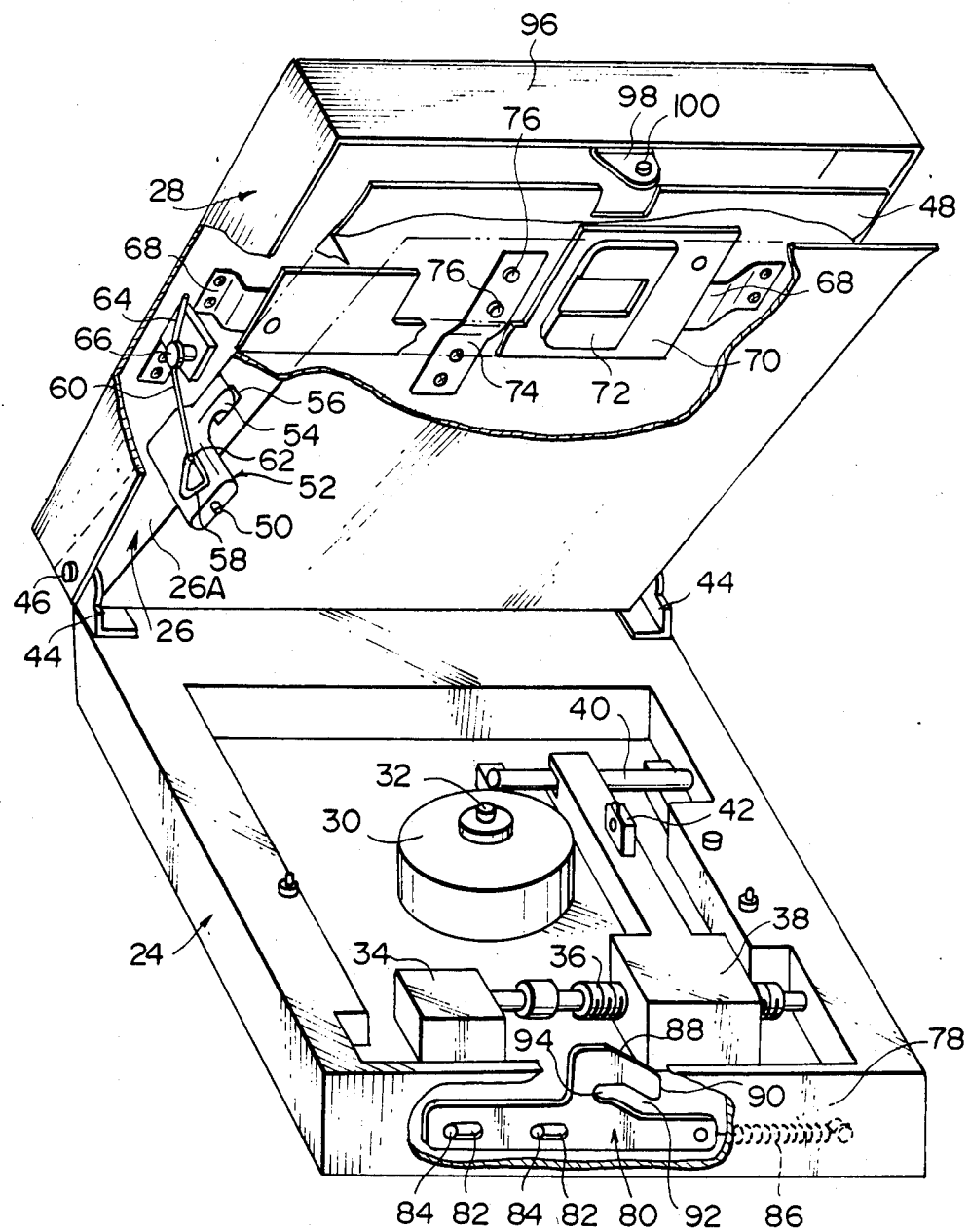
FIG. 3 is a perspective view showing the magnetic recorder or reproducer in an electronic camera, to which the device for loading or unloading the magnetic disc pack according to the present invention is applied.

FIG. 3 shows the magnetic recorder or reproducer in an electronic camera or the like, to which is applied the device for loading or unloading the magnetic disc pack according to the present invention. The magnetic recorder or reproducer includes a main body 24, an inner bucket 26 and a lid 28. Firstly, description will be given to the inner construction of the main body 24 of the magnetic recorder or reproducer. The main body 24 is provided therein with a motor 30 for driving a magnetic disc 12. A drive shaft 32 of this motor 30 is coupled into a center hole 15 of a center core 14 of the magnetic disc pack 10 as shown in FIG. 1 and rotates the magnetic disc 12 at a predetermined speed in the magnetic disc pack 10. In FIG. 3, designated at 34 is a motor for driving the magnetic head, 36 a lead screw connected to an output shaft of the motor 34, 38 a head carriage threadably coupled to this lead screw 36 and guided by a guide shaft 40 to move, and 42 a magnetic head provided on the head carriage 38. In consequence, when the motor 34 is rotated at a predetermined speed, the head carriage 38 is moved by a predetermined pitch in the axial direction of the guide shaft 40 by the rotation of the lead screw 36, whereby the magnetic head 42 moves in the radial direction of the magnetic disc 12, so that the still image information can be recorded or reproduced per track on the magnetic disc 12.

The main body 24 of the magnetic recorder or reproducer is provided at an end portion thereof with brackets 44 and 44, on which the inner bucket 26 and the lid 28 are pivotally supported through a pin 46. As shown in the drawing, the lid 28 is formed into a shape capable of housing the inner bucket 26. The lid 28 is biased by a torsional spring 29 shown in FIG. 4 in the opening direction of the main body 24 of the magnetic recorder or reproducer. Further, provided between the lid 28 and the inner bucket 26 is another leaf spring 27, which biases the inner bucket 26 in a direction of being separated from the lid 28. In consequence, in the state where the lid 28 is opened as shown in FIG. 3, the inner bucket 26 is separated from the main body 24 and the lid 28, whereby an opening 48 for receiving the magnetic disc pack 10 of the inner bucket 26 is opened.

A surface opposed to the main body 24 of the inner bucket 26 is formed with a plurality of openings for respectively receiving a rotary shaft 32 provided on the main body 24, a magnetic head 42 and a positioning pin provided on the main body 24 for positioning the main body 24 and the magnetic disc pack 10.

An engaging member 52 is rockingly supported through a shaft 50 on the left end face 26A of the inner bucket 26 in FIG. 3. More specifically the inner bucket 26 is provided with a bracket (not shown). The engaging member 52 is rockingly supported through a shaft 50 provided on this bracket. This engaging member 52 is projectingly provided with an engaging pawl 54, which is opposed to an engageable hole 56 formed on an end face 26A of the inner bucket 26. The engageable hole 56 is formed at a position opposed to the engageable recess 22 of the magnetic disc pack 10 in the state where the magnetic disc pack 10 is completely inserted into the inner bucket 26. Further, a groove 58 of a generally triangular shape is formed on the outer surface of this engaging member 52. As shown in FIG. 3, the triangular groove 58 is formed to stride the shaft 50. A pin 62 formed by bending the forward end of a spring 60 into an L-shape is slidably and loosely coupled into this groove 58. The spring 60 is provided on the rear surface of the lid 28 through a bracket 64 and a pin 66 and biases the engaging member 52 toward the end face 26A of the inner bucket 26 and has a biasing force for rotating itself about the pin 66 in the clockwise direction in FIG. 3.

Further, leaf springs 68 and 68 each being bent into a crank shape are provided on the rear surface of the lid 28 at a predetermined interval. A regulating plate holder 70 is provided for the leaf springs 68 and 68. The regulating plate holder 70 is provided thereon with a regulating plate 72 for bringing the magnetic disc 12 into stable contact with the magnetic head 42. The regulating plate 72 is formed at a position opposed to the magnetic head 42 when the lid 28 is closed.

Figure 4:
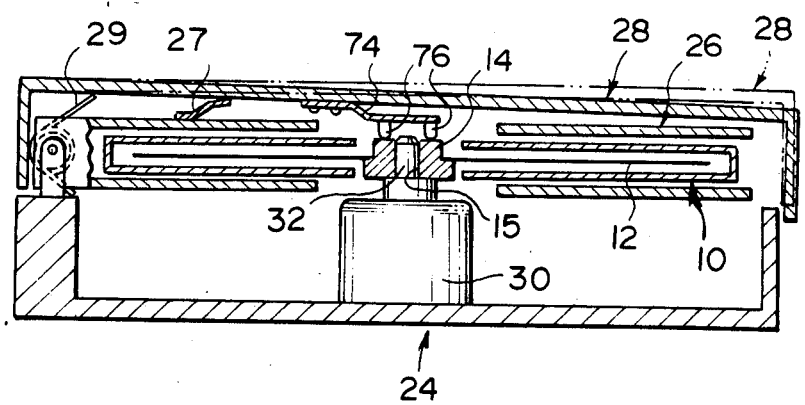
FIG. 4 is a sectional view showing this embodiment in the state where the lid is closed.

Further, a pair of push pins 76 and 76 are provided on the rear surface of the lid 28 at a predetermined interval through a leaf spring 74. During the operation of closing the lid 28 as shown in FIG. 4, the push pins 76 and 76 push the center core 14 of the magnetic disc 12 toward the drive shaft 32 to perform the function of reliably inserting the drive shaft 32 into the center hole 15 of the center core 14.

Figure 5:
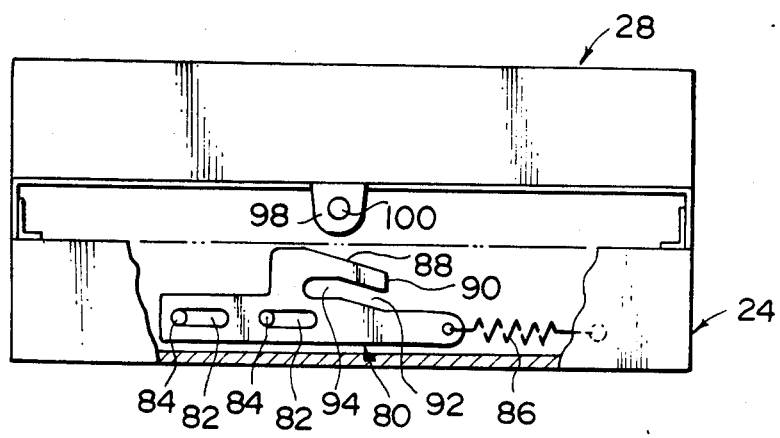
FIG. 5 is a front view showing this embodiment in the process where the lid is being closed.

A slide key 80 is mounted to a front edge 78 of the main body 24 of the magnetic recorder or reproducer so as to be slidable in the lateral direction. This slide key 80 is formed with slots 82 and 82, into which pins 84 and 84 projecting from the front edge 78 are coupled, whereby the movement of the slide key 80 is regulated. A spring 86 is engaged with the right end of the slide key 80, whereby the slide key 80 is biased to the right. The slide key 80 is formed at the top end portion thereof with a tapered portion 88, a side edge 90 is downwardly formed from the terminating end portion of this tapered portion 88, and a groove 92 inclined upwardly to the left is formed from the bottom end portion of the side edge 90. Further, the left end portion of this inclined groove 92 is communicated with a lateral groove 94. As shown in FIG. 5, a tongue 98 is formed on a front edge of the lid 28, and a lock pin 100 projects from this tongue 98. In consequence, when the lid 28 is closed toward the main body 24, the lock pin 100 firstly comes into contact with the tapered portion 88, and further, when the lid 28 is pushed down, the slide key 80 moves to the left against the biasing force of the spring 86. The lock pin 100 slides down along the tapered portion, and thereafter passes through the side edge 90 while being in contact with the side edge 90. The lock pin 100 then enters the inclined groove 92 from the side edge 90. When the force applied to the lid 28 is removed in the state where the lock pin 100 is in the inclined groove 92, the slide key 80 is pulled by the spring 86, the lock pin 100 goes up in the inclined groove 92 and is positioned in the lateral groove 94. When the lock pin 100 is positioned in the lateral groove 94, this position is the normally closed position of the lid 28. In consequence, when the lock pin 100 is positioned in the inclined groove 92, the lid 28 is in the state where the lid 28 is somewhat more excessively pushed in the closing direction than the normally closed position.

The following is the action of one embodiment of the device for loading or unloading a magnetic disc pack, having the above-described arrangement according to the present invention. Firstly, in loading the magnetic disc pack 10, when the magnetic disc pack is inserted into the inner bucket 26 in the state where the lid 28 is opened as shown in FIG. 3, the magnetic disc pack 10 is provisionally locked by the engaging pawl 54 in the inner bucket 26. Subsequently, when the lid 28 is pushed down toward the main body 24 in this state, the lock pin 100 comes into contact with the tapered portion 88 of the slide key 80 to move the slide key 80 to the left in FIG. 3 against the biasing force of the spring 86, whereby the lock pin 100 is coupled into the inclined groove 92. In this position, the lid 28, as indicated by solid lines in FIG. 4, is located at a position slightly lower than the normally closed position (indicated by solid lines in FIG. 4), and the push pins 76 and 76 urge the center core 14 toward the drive shaft 32, whereby the center core 14 is reliably secured to the drive shaft 32. Then, when the lock pin 100 is positioned in the lateral groove 94, in this position the lid 28 is in the normally closed position (indicated by the dotted chain lines in FIG. 4), the push pins 76 and 76 are separated from the center core 14, so that the magnetic disc 12 can be rotated by the drive shaft 32.

Description will hereunder be given of the operation of unloading the magnetic disc pack 10. Firstly, the slide key 80 is moved to the left in FIG. 5 against the biasing force of the spring 86, simultaneously, the lid 28 being in the closed state is slightly pushed down in the closing direction, and the lock pin 100 is positioned in the inclined groove 92. When the lock pin 100 is positioned in the inclined groove 92, the lid 28 is in a position indicated by solid lines in FIG. 4, and the push pins 76 and 76 are in contact with the center core 14. In consequence, even if the drive shaft 32 is rotating due to the inertial force, a braking force is given to the drive shaft 32 due to the contact of the push pins 76 and 76, whereby the drive shaft 32 is stopped in rotation. Subsequently, when the lock pin 100 is released from the inclined groove 92, the lid 28 is rotated in the opening direction by the biasing force of the spring 29, whereby the magnetic disc pack 10 in the inner bucket 26 is moved and the magnetic disc 12 is released from the drive shaft 32. In this case, the center core 14 is withdrawn from the stopped drive shaft 32, so that no damage is caused to the center core 14 and/or the drive shaft 32.

As described above, in the device for loading or unloading the magnetic disc pack according to the present invention, the push member is provided on the rear surface of the lid, and, in loading the magnetic disc pack into the magnetic recorder and/or reproducer, the center core of the magnetic disc is pushed against the drive shaft by means of the push member, so that the center core of the magnetic disc can be reliably secured to the drive shaft. Furthermore, in unloading the magnetic disc pack from the magnetic recorder and/or rereproducer, similarly to the above, the push member is brought into contact with the center core, whereby the drive shaft, which has been rotated due to the inertial force, is stopped in rotation, so that no damages are caused to the center core and/or the drive shaft during withdrawal of the center core.

FIGS. 6 to 10 show the construction of another embodiment according to the present invention.

Figure 6:
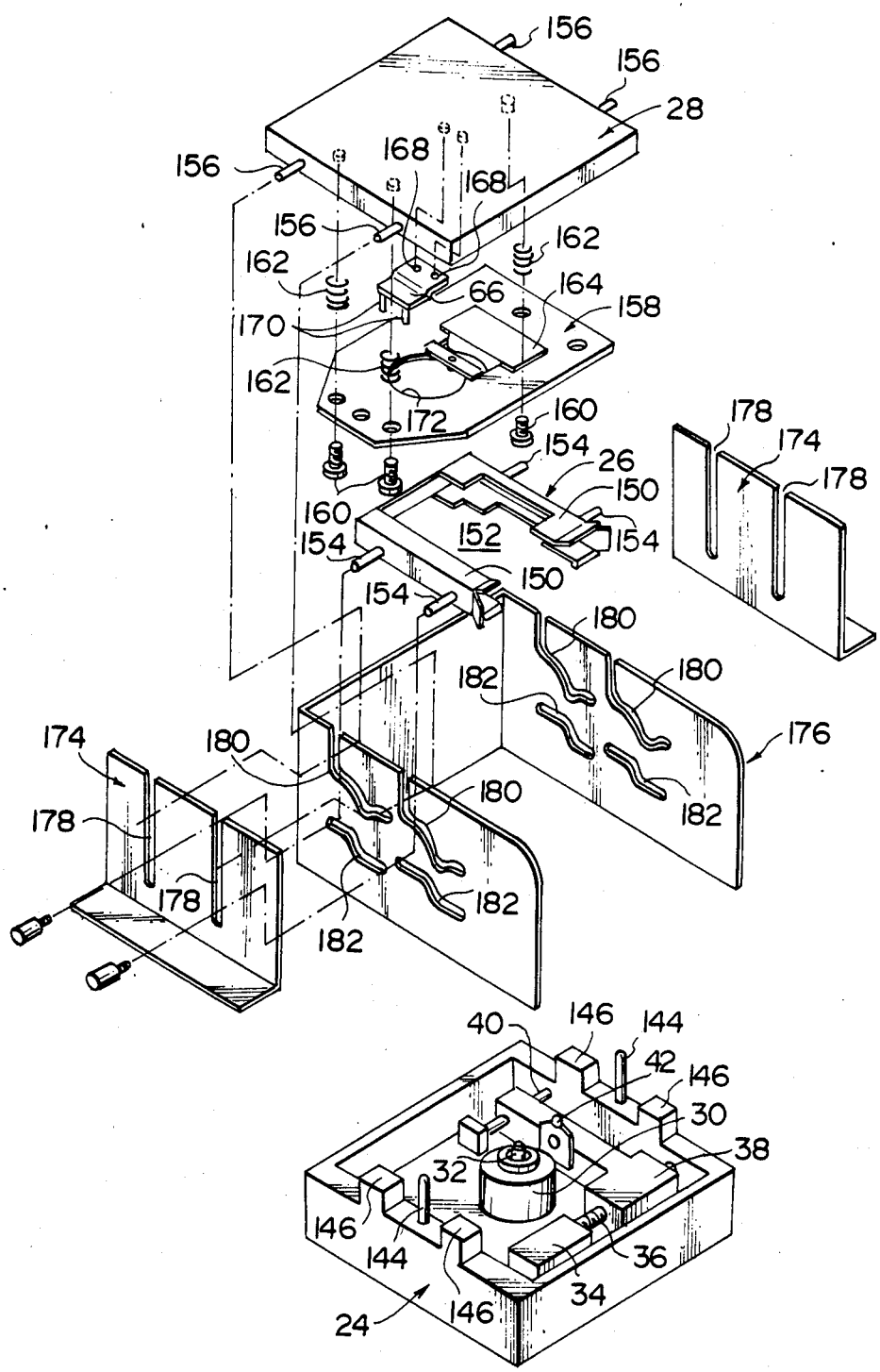
FIG. 6 is a perspective view showing the magnetic recorder-reproducer, to which is applied the device for loading or unloading the magnetic disc pack of a front loading type.
Figure 7:
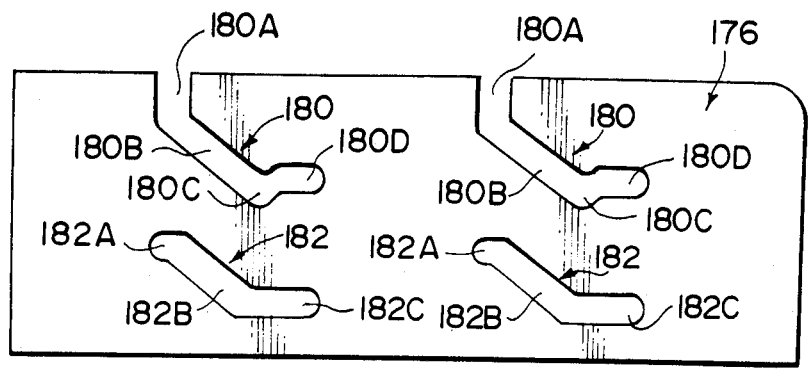
FIG. 7 is a side view showing the shape of the guide groove of a slide plate.

FIG. 6 is a perspective view generally showing the magnetic recorder-reproducer, to which is applied the device for loading or unloading the magnetic disc pack of the front loading type. In the inner construction of the main body 24 of the magnetic recorder-reproducer, the same or similar members as shown in FIG. 3 are provided with the same reference numerals being used to designate the same parts. Designated at 144 and 144 are positioning pins for a regulating plate holder to be described hereunder, and 146, 146, 146 and 146 a surface for receiving the regulating plate holder.

As shown in FIG. 6, the inner bucket 26 is constructed such that side edges 150 and 150 are bent into a U-shape in cross section to be able to receive therein the magnetic disc pack 10, and an opening 152 is formed in the central portion thereof, so that the drive shaft 32, the magnetic head 42 and the like on the side of the main body 24 can be inserted through this opening 152. Each of the side edges 150 and 150 of the inner bucket 26 is projectingly provided at the side surface thereof with a pair of guide pins 154 and 154. These guide pins 154 and 154 are guided by a slide plate to be described hereunder, to vertically move the inner bucket 26 with the magnetic disc pack being loaded therein with respect to the main body 24.

The lid 28 as being the member for holding the push member and the regulating plate holder, similarly to the inner bucket 26, is projectingly provided at the opposite side surfaces thereof with a pair of guide pins 156 and 156, which cause the slide plate 176 to slide to vertically move the lid 28 with respect to the main body 24. A regulating plate holder 158 is resiliently supported by the rear surface of the lid 28 through three screws 160, 160 and 160 and three springs 162, 162 and 162. This regulating plate holder 158 is provided with the regulating plate 164, which has the function of attaching the magnetic disc 12 to the magnetic head 42 at the time of magnetically recording in the magnetic disc 12 or reproducing therefrom by means of the magnetic head 42. Further, a mounting plate 166 is secured to the rear surface of the lid 28 through screws 168 and 168, and a pair of push pins 170 and 170 directed downwardly in FIG. 6 are planted on this mounting plate 166. On the other hand, the regulating plate holder 158 is formed therein with an opening 172, and the push pins 170 are located in this opening 172, whereby, as the lid 28 moves downward, the push pins 170 push the center core 14 of the magnetic disc 12 toward the drive shaft 32.

A pair of side plates 174 and 174 are secured to the main body 24. Further, the slide plate 176 bent into a U-shape is slidably provided inside these side plates 174 and 174. Each of the side plates 174 is formed with two longitudinal grooves 178 and 178 at a predetermined interval, and further, in the opposing side surfaces of the slide plate 176, there are formed guide grooves 180 and 180 for guiding the lid 28 and guide grooves 182 and 182 for guiding the inner bucket 26. The guide pins 156 of the lid 28 are inserted through the guide grooves 180, and the guide pins 154 of the inner bucket 26 are inserted through the guide grooves 182. Description will hereunder be given of the shapes of the guide grooves 180 and 182 with reference to FIG. 7. Each of the guide groove 180 consists of a longitudinal groove 180A, a tapered groove 180B contiguous to this longitudinal groove 180A, an overstroke groove 180C contiguous to this tapered groove 180B, and further, a lateral groove 180D being at a position slightly risen from the overstroke groove 180C. On the other hand, the guide groove 182 consists of a lateral groove 182A, a tapered groove 182B contiguous to this lateral groove 182A, and a lateral groove 182C contiguous to this tapered groove 182B. As apparent from FIG. 7, the tapered groove 180B of the guide groove 180 and the tapered groove 182B of the guide groove 182 have gradients substantially equal to each other. As will be described hereunder, the guide pins 156 are positioned in the guide grooves 180 and the longitudinal grooves 178 and cause the slide plates 176 to slide, so that the lid 28 can be vertically moved with respect to the main body 24. The guide pins 154 of the inner bucket 26 are positioned in the longitudinal grooves 178 and the guide grooves 182, and, when the slide plate 176 slides, the guide pins 154 are guided by the guide grooves 182 to be vertically moved with respect to the main body 24.

Figure 8A:
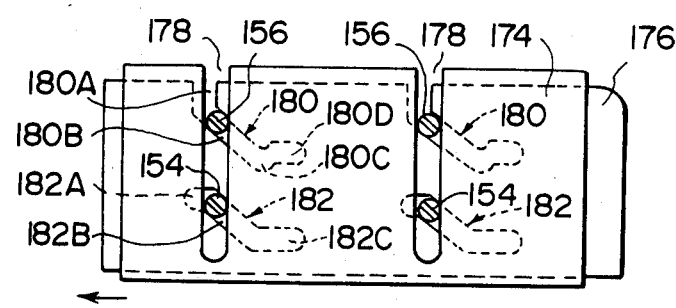
Figure 8B:
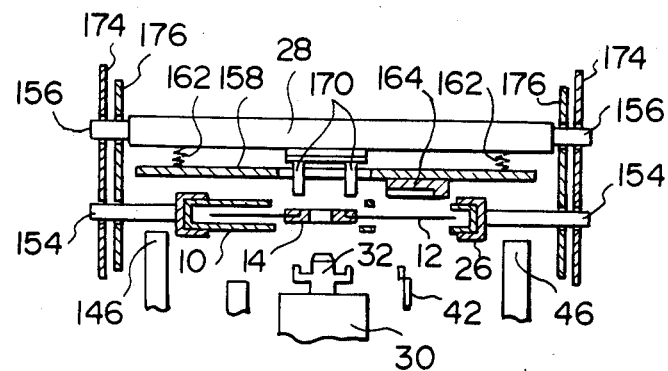

The following is the action of the embodiment with the above-described arrangement according to the present invention. Firstly, when the guide pins 156 of the lid 28 are positioned in the longitudinal grooves 180A of the slide plate 176, the guide pins 154 of the inner bucket 26 are positioned in the lateral grooves 182A of the slide plate 176. In this state, if a force in the leftward direction in FIG. 8(A) is applied to the slide plate 176, then the guide pins 156 begin to be positioned at the top end of the tapered grooves 180B. When the slide plate 176 begins to move to the left, the guide pins 154 of the inner bucket 26 begin to descend in the tapered grooves 182B accordingly. FIG. 8(B) shows the positions of the lid 28 and the inner bucket 26 in this state. In this state, the magnetic disc pack 10 held by the inner bucket 26 is positioned upwardly of the drive shaft 32, being in non-contact with the drive shaft 32. Further, the lid 28 is also in a position spaced apart from the inner bucket 26, and, the push pins 170 and 170 are in non-contact with the center core 14 of the magnetic disc 12.

Figure 9A:
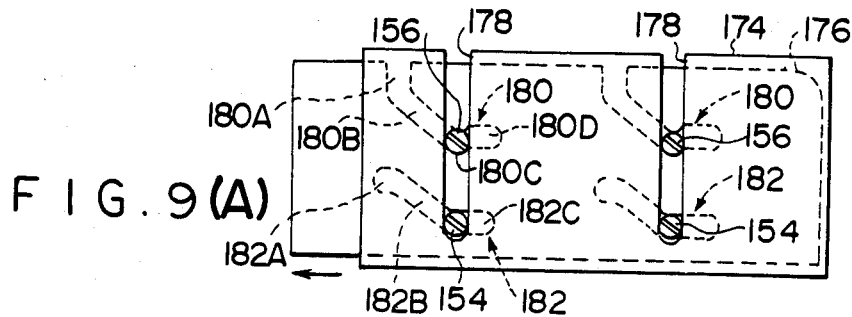
Figure 9B:
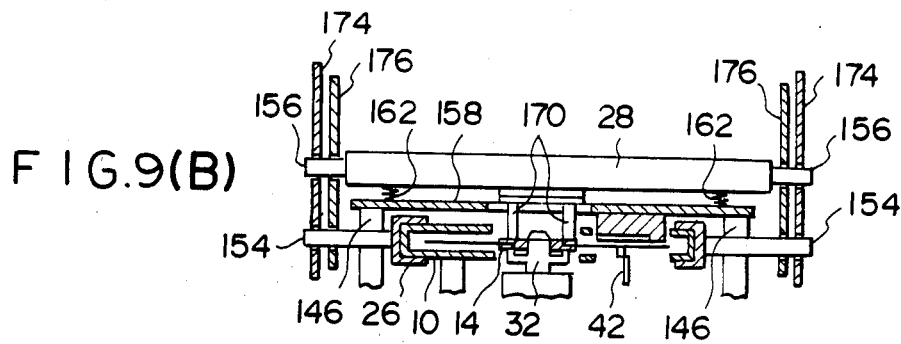

When the slide plate 176 further moves to the left from the above state, the guide pins 156 descend in the tapered grooves 180B, and the inner bucket 26, being guided by the guide grooves 182, descend toward the main body 24. When the guide pins 156 reach the overstroke groove 180C as shown in FIG. 9(A), the guide pins 154 of the inner bucket 26 comes into the starting end positions of the lateral grooves 180C. Description will now be given of the relationship between the inner bucket 26 and the lid 28 in these positions. As shown in FIG. 9(B), the magnetic disc pack 10 received in the inner bucket 26 is located in a position where the magnetic disc pack 10 is connectible to the drive shaft 32, and the magnetic disc 12 in the magnetic disc pack 10 is coupled to the drive shaft 32 through the center core 14 thereof. On the other hand, immediately before the guide pins 156 of the lid 28 enter the overstroke groove 180C, firstly, the regulating plate holder 158 comes into contact with the receiving surfaces 146 of the main body 24 to be regulated in height, further, when the lid 28 is pushed down against the biasing force of the spring 162, the push pins 170 and 170 come into contact with the center core 14 of the magnetic disc 12 and forcedly push the same down, to thereby reliably couple the center core 14 onto the drive shaft 32. In this state, the guide pins 156 of the lid 28 are positioned in the overstroke grooves 180C as shown in FIG. 9(A), and the push pins 170 and 170 are in positions shown in FIG. 9(B).

Figure 10A:
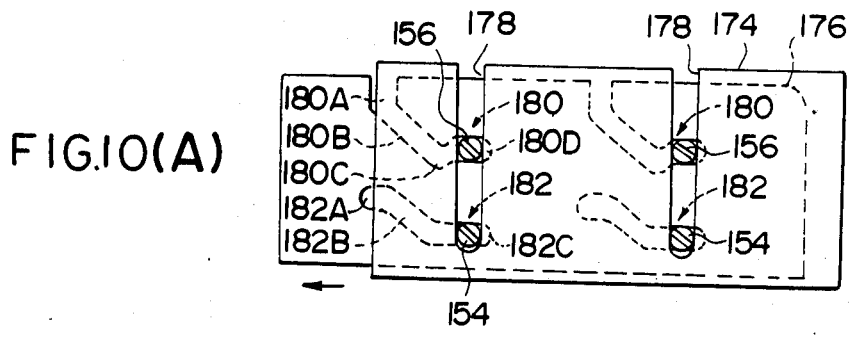
Figure 10B:
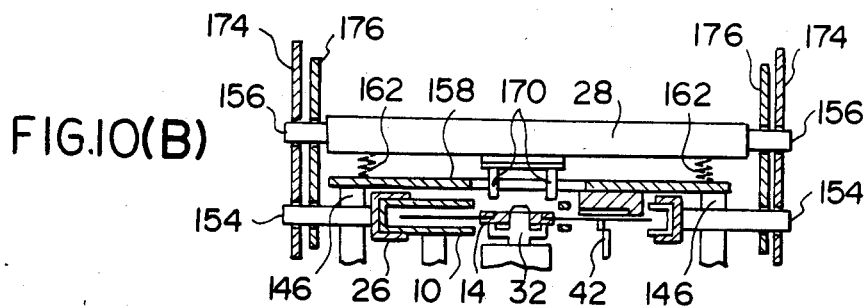

When the slide plate 176 is moved further to the left from this state, the guide pins 156 of the lid 28 ascend from the overstroke grooves 180C to the lateral grooves 180D contiguous thereto. Accordingly, the guide pins 154 of the inner bucket 26 come to the terminating end positions of the lateral grooves 182C. FIGS. 10(A) and 10(B) show this state. More specifically, as the guide pins 156 ascend from the overstroke grooves 180C to the lateral grooves 180D, the lid 28 also ascends. However, the guide pins 154 are still positioned in the lateral grooves 182C, whereby the inner bucket 26 still is coupled to the drive shaft 32. The push pins 170 and 170 are separated from the center core 14 as the lid 28 ascends, so that the center core 14 can rotate at a required speed without being disturbed by the push pins 170 and 170.

To take out the magnetic disc pack 10, the preceding steps are reversed. More specifically, the slide plate 176 is moved to the right from the state shown in FIGS. 10(A) and 10(B), and the guide pins 156 are provisionally returned from the lateral grooves 180D to the overstroke grooves 180C. In this state, the push pins 170 and 170 are brought into contact with the center core 14 of the magnetic disc 12, whereby the drive shaft 32 is reliably stopped in rotation. When the slide plate 176 is moved further to the right, the guide pins 156 of the lid 28 begin to ascend in the tapered grooves 180B. As the slide plate 176 moves, the guide pins 154, which have been positioned at the bottom ends of the tapered grooves 182B of the slide plate 176 begin to ascend in the tapered grooves 182B. Due to the upward movement of the guide pins 154 in the tapered grooves 182B, the inner bucket 26 begins to ascend and is separated from the drive shaft 32. At the terminating end of the upward movement of the inner bucket 26, the magnetic disc pack 10 can be taken out of the inner bucket 26.

In the preceding first and second embodiments, the push pins 76, 76, 170 and 170 have been used as the push members, however, the present invention need not necessarily be limited to these embodiments. Any arrangement may be adopted in which the center core of the magnetic disc can be resiliently pushed.

As has been described hereinabove, in the device for loading or unloading the magnetic disc pack, there is provided a push member which pushes the center core of the magnetic disc, and, when the magnetic disc pack is loaded into the magnetic recorder and/or reproducer, the center core of the magnetic disc is pushed against the drive shaft by the push member, so that the center core of the magnetic disc can be reliably secured to the drive shaft.

What is claimed is:

1. A device for loading or unloading a magnetic disc pack in a magnetic recorder and/or reproducer, wherein magnetic recording is effected into a magnetic disc rotatably mounted in said magnetic disc pack or reproduction is effected therefrom, comprising:

a main body, having provided thereon a driving motor having a rotary driving shaft;

a cassette holder for receiving said magnetic disc pack, and projectingly provided at the side edges thereof with first guide pins;

a lid projectingly provided at side edges thereof with second guide pins;

a push member, provided on said lid, for pushing a center core of said magnetic disc toward the rotary drive shaft;

side plates provided at opposite sides of the main body and having controlling grooves formed thereon, said controlling grooves receiving said first and second guide pins; and a slide plate movably provided on the main body, said slide plate having first guide grooves for receiving said first guide pins, said first guide grooves being shaped so as to guide the cassette holder from a first cassette holder position for inserting and removing the magnetic disc pack to a second cassette holder position for reproduction and recording wherein the center core of the magnetic disc is engaged with the rotary drive shaft, wherein said first guide grooves include first lateral grooves which define said first cassette holder position and second lateral grooves which define said second cassette holder position, said slide plate further having second guide grooves for receiving said second guide pins, said second guide grooves being shaped so as to guide the lid from a first position of non-contact between said push member and said center core, through a second position of contact between said push member and said center core, to a third position of non-contact between said push member and said center core, said first and third lid positions being different from each other, wherein said second guide grooves include overstroke grooves which define said second position of contact and third lateral grooves, contiguous with said overstroke grooves, which define said third position of non-contact, movement of said slide plate moving said cassette holder into contact with said rotary drive shaft and moving said lid at the same time so that the push member is brought into and out of contact with the center core, said push member being out of contact with the center core during reproduction and recording.

2. A device for loading or unloading a magnetic disc pack as set forth in claim 1, wherein:

said side plates are adjacent said slide plate, and said controlling grooves are longitudinal grooves hich extend in directions parallel to the axis of the rotary drive shaft; and said first and second guide pins are loosely coupled into the first and second guide grooves and the longitudinal grooves.

3. A device for loading or unloading a magnetic disc pack as set forth in claim 1, further including tapered grooves which connect said first lateral grooves with the respective second lateral grooves.

4. A device for loading or unloading a magnetic disc pack as set forth in claim 3, wherein said lid has provided thereon a regulating plate holder and at least one spring, said spring positioning said regulating plate at a predetermined height during loading of said magnetic disc pack.

5. A device for loading or unloading a magnetic disc pack as set forth in claim 4, wherein said push member includes a pair of pins.

6. A device for loading or unloading a magnetic disc pack as set forth in claim 5, wherein said slide plate is bent into a U-shape.

7. A device for loading or unloading a magnetic disc pack as set forth in claim 6, wherein said first guide pins are provided in two pairs, one pair of said first guide pins being provided at each of the side edges of the cassette holder.

8. A device for loading or unloading a magnetic disc pack as set forth in claim 7, wherein said second guide pins are provided in two pairs, one pair of said second guide pins being provided at each of the side edges of the lid.

9. A device for loading or unloading a magnetic disc pack as set forth in claim 3, wherein one pair of said controlling grooves are formed in each of said side plates, and a pair of the first guide grooves and a pair of the second guide grooves are formed at each of the side surfaces of said slide plate.

* * * * *